(12) United States Patent
Sun et al.

(10) Patent No.: US 11,562,217 B2
(45) Date of Patent: Jan. 24, 2023

(54) APPARATUSES AND METHODS FOR APPROXIMATING NONLINEAR FUNCTION

(71) Applicant: ALIBABA GROUP HOLDING LIMITED, Grand Cayman (KY)

(72) Inventors: Fei Sun, San Mateo, CA (US); Wei Han, San Mateo, CA (US); Qinggang Zhou, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 269 days.

(21) Appl. No.: 16/834,262

(22) Filed: Mar. 30, 2020

(65) Prior Publication Data

US 2021/0303977 A1   Sep. 30, 2021

(51) Int. Cl.
*G06N 3/063* (2006.01)
*G06N 3/04* (2006.01)
*G06F 9/30* (2018.01)
*G06F 1/03* (2006.01)

(52) U.S. Cl.
CPC ............. *G06N 3/063* (2013.01); *G06F 1/03* (2013.01); *G06F 9/3001* (2013.01); *G06F 9/30098* (2013.01); *G06N 3/0481* (2013.01)

(58) Field of Classification Search
CPC ....... G06N 3/063; G06N 3/0481; G06N 3/082; G06F 9/30098; G06F 9/3001; G06F 1/03; G06F 9/3004
USPC .................................................. 708/270–276
See application file for complete search history.

(56) References Cited

U.S. PATENT DOCUMENTS 7,058,675 B1 * 6/2006 Choo ................. G06F 1/03
                                                  708/272
7,260,592 B2 * 8/2007 Sheaffer ............. G06F 9/3555
                                                  712/E9.044
11,328,015 B2 * 5/2022 Mangnall ............ G06F 16/9017

* cited by examiner

*Primary Examiner* — Tan V Mai
(74) *Attorney, Agent, or Firm* — Finnegan, Henderson, Farabow, Garrett & Dunner, LLP

(57) ABSTRACT

The present disclosure relates to a method and an apparatus for approximating non-linear function. In some embodiments, an exemplary processing unit includes: one or more registers for storing a lookup table (LUT) and one or more operation elements communicatively coupled with the one or more registers. The LUT includes a control state and a plurality of data entries. The one or more operation elements are configured to: receive an input operand; select one or more bits from the input operand; select a data entry from the plurality of data entries using the one or more bits; and determine an approximation value of a non-linear activation function for the input operand using the data entry.

20 Claims, 13 Drawing Sheets

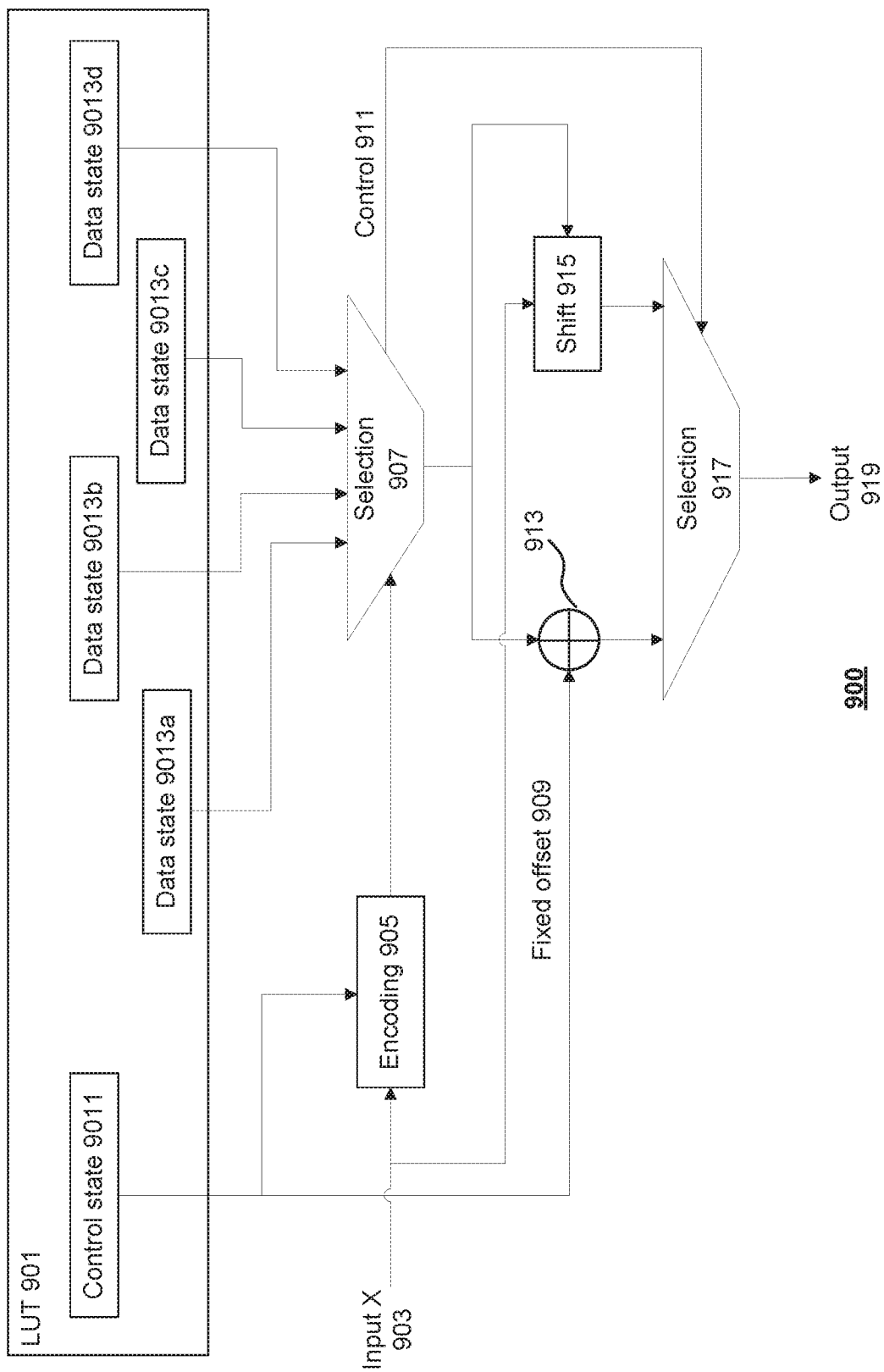

APPARATUSES AND METHODS FOR APPROXIMATING NONLINEAR FUNCTION

BACKGROUND

Machine learning (ML) or deep learning (DL) has been growing exponentially in the last decade. ML and DL use neural networks, which are mechanisms that basically mimic how a human brain learns. These neural networks can often use large data sets, resulting in a very time-consuming training process.

Non-linear functions (e.g., ReLu, ReLu6, Leaky ReLu, sigmoid, tanh, and the like) are used frequently in ML or DL neural networks. Since dedicated hardware can accelerate General Matrix to Matrix Multiplication (GeMM), the speed of processing non-linear functions may limit the total performance of execution of neural networks.

SUMMARY

In some embodiments, an exemplary processing unit can include one or more registers for storing a lookup table (LUT) and one or more operation elements communicatively coupled with the one or more registers. The LUT can include a control state and a plurality of data entries. The one or more operation elements can be configured to: receive an input operand; select one or more bits from the input operand; select a data entry from the plurality of data entries using the one or more bits; and determine an approximation value of a non-linear activation function for the input operand using the data entry.

In some embodiments, an exemplary processing core can include a local memory and an operation unit communicatively coupled with the local memory. The operation unit can include one or more registers for storing a LUT and one or more operation elements communicatively coupled with the one or more registers. The LUT can include a control state and a plurality of data entries. The one or more operation elements can be configured to: receive an input operand; select one or more bits from the input operand; select a data entry from the plurality of data entries using the one or more bits; and determine an approximation value of a non-linear activation function for the input operand using the data entry.

In some embodiments, a non-transitory computer readable storage medium can store a set of instructions that are executable by one or more processing devices to cause a processing unit to perform a method including: receiving an input operand; selecting one or more bits from the input operand; selecting a data entry from a LUT using the one or more bits; determining an approximation value of a non-linear activation function for the input operand using the data entry; and executing the neural network with the approximation value.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 9 illustrates a schematic representation of an exemplary absolute value LUT mechanism, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

Non-linear functions used in ML or DL neural networks include, but not limited to, ReLu, ReLu6, Leaky ReLu, Elu, GeLu, Sigmoid, Tanh, and the like. In some ML or DL neural networks, the precision of non-linear functions does not need to be very high. Conventionally, there are several approaches to approximate non-linear functions. In a software approach, non-linear functions can be implemented as polynomial approximations. But this may take several to hundreds of cycles, which is not efficient. In a hardware approach, non-linear functions can be implemented as look-up tables (LUTs). But there are many separate LUTs with fixed contents for different non-linear functions, which is neither flexible nor area efficient.

Embodiments of the present disclosure can improve conventional approaches of approximating non-linear functions. For example, some embodiments of the present disclosure can provide flexibility to handle different non-linear functions using the same hardware. In comparison with the software approach, some embodiments of the present disclosure can reduce the required number of cycles.

It is appreciated that embodiments of the present disclosure can be implemented by various processing units, including, but not limited to, a general purpose processor (e.g., a central processing unit (CPU)), a neural network processing unit (NPU), a graphics processing units (GPU), a field programmable gate arrays (FPGA), a tensor processing units (TPU), an application-specific integrated circuits (ASIC), and the like.

Figure 1A:
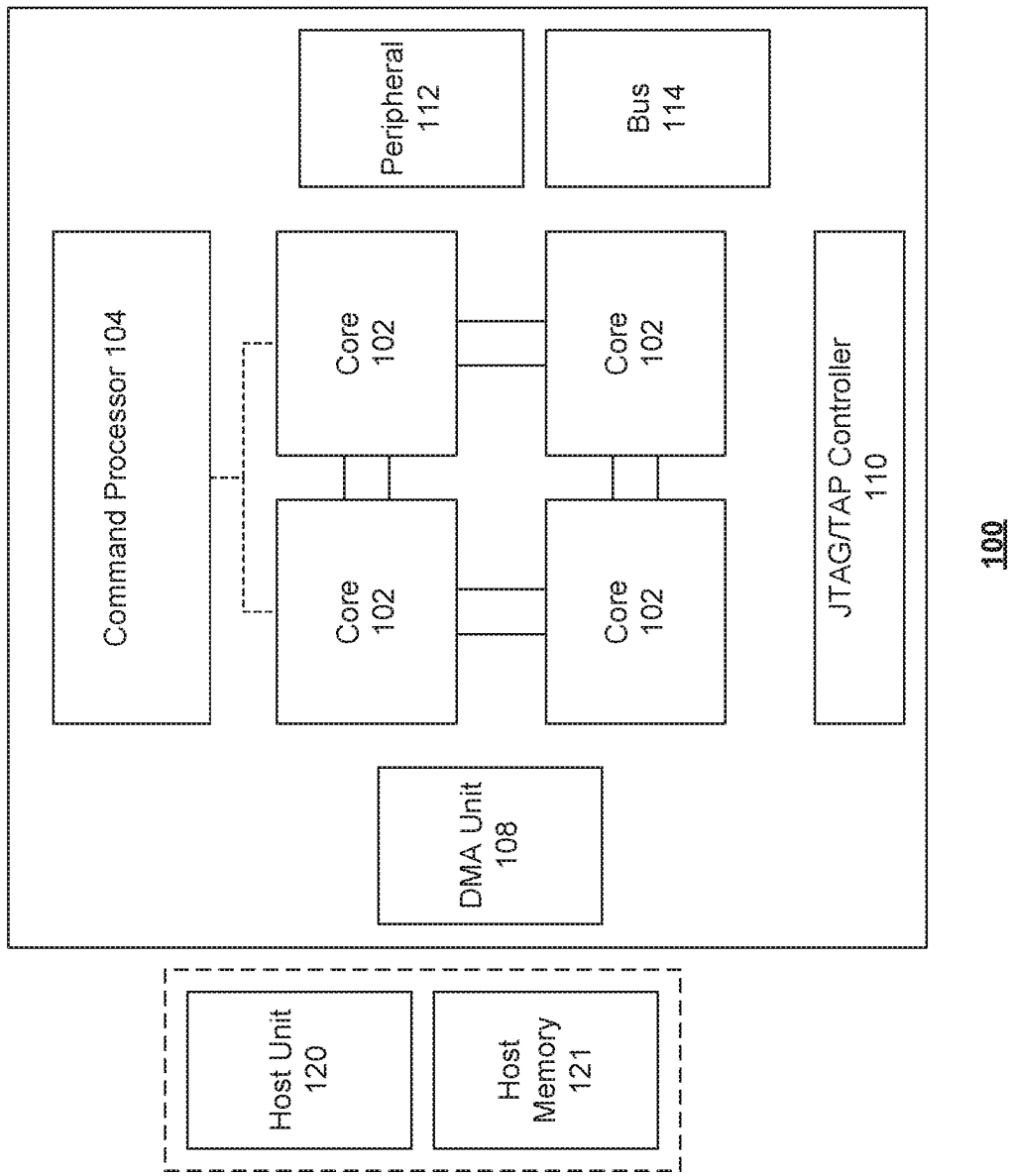
FIG. 1A illustrates an exemplary neural network accelerator architecture, according to some embodiments of the present disclosure.

FIG. 1A illustrates an exemplary neural network accelerator architecture, according to some embodiments of the present disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1A, accelerator architecture 100 can include a plurality of cores 102, a command processor 104, a direct memory access (DMA) unit 108, a Joint Test Action Group (JTAG)/Test Access End (TAP) controller 110, a peripheral interface 112, a bus 114, and the like.

It is appreciated that, cores 102 can perform algorithmic operations based on communicated data. Cores 102 can include one or more processing elements that may include single instruction, multiple data (SIMD) architecture including one or more processing units configured to perform one or more operations (e.g., multiplication, addition, multiply-accumulate (MAC), etc.) based on commands received from command processor 104. To perform the operation on the communicated data packets, cores 102 can include one or more processing elements for processing information in the data packets. Each processing element may comprise any number of processing units. According to some embodiments of the present disclosure, accelerator architecture 100 may include a plurality of cores 102, e.g., four cores. In some embodiments, the plurality of cores 102 can be communicatively coupled with each other. For example, the plurality of cores 102 can be connected with a single directional ring bus, which supports efficient pipelining for large neural network models. The architecture of cores 102 will be explained in detail with respect to FIG. 1B.

Command processor 104 can interact with a host unit 120 and pass pertinent commands and data to corresponding core 102. In some embodiments, command processor 104 can interact with host unit under the supervision of kernel mode driver (KMD). In some embodiments, command processor 104 can modify the pertinent commands to each core 102, so that cores 102 can work in parallel as much as possible. The modified commands can be stored in an instruction buffer. In some embodiments, command processor 104 can be configured to coordinate one or more cores 102 for parallel execution.

DMA unit 108 can assist with transferring data between host memory 121 and accelerator architecture 100. For example, DMA unit 108 can assist with loading data or instructions from host memory 121 into local memory of cores 102. DMA unit 108 can also assist with transferring data between multiple accelerators. DMA unit 108 can allow off-chip devices to access both on-chip and off-chip memory without causing a host CPU interrupt. In addition, DMA unit 108 can assist with transferring data between components of accelerator architecture 100. For example, DMA unit 108 can assist with transferring data between multiple cores 102 or within each core. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 100 can include a second DMA unit, which can be used to transfer data between other accelerator architectures to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 (such as a I2C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 114 can provide high speed communication across cores and can also connect cores 102 with other units, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

Accelerator architecture 100 can also communicate with a host unit 120. Host unit 120 can be one or more processing unit (e.g., an X86 central processing unit). As shown in FIG. 1A, host unit 120 may be associated with host memory 121. In some embodiments, host memory 121 may be an integral memory or an external memory associated with host unit 120. In some embodiments, host memory 121 may comprise a host disk, which is an external memory configured to provide additional memory for host unit 120. Host memory 121 can be a double data rate synchronous dynamic random-access memory (e.g., DDR SDRAM) or the like. Host memory 121 can be configured to store a large amount of data with slower access speed, compared to the on-chip memory integrated within accelerator chip, acting as a higher-level cache. The data stored in host memory 121 may be transferred to accelerator architecture 100 to be used for executing neural network models.

In some embodiments, a host system having host unit 120 and host memory 121 can comprise a compiler (not shown). The compiler is a program or computer software that transforms computer codes written in one programming language into instructions for accelerator architecture 100 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 100. As discussed above, these commands can be further processed by command processor 104 of accelerator architecture 100, temporarily stored in an instruction buffer (not shown) of accelerator architecture 100, and distributed to corresponding one or more cores (e.g., cores 102 in FIG. 1A) or processing elements. Some of the commands may instruct a DMA unit (e.g., DMA unit 108 of FIG. 1A) to load instructions and data from host memory (e.g., host memory 121 of FIG. 1A) into accelerator architecture 100. The loaded instructions may then be distributed to each core (e.g., core 102 of FIG. 1A) assigned with the corresponding task, and the one or more cores may process these instructions.

Figure 1B:
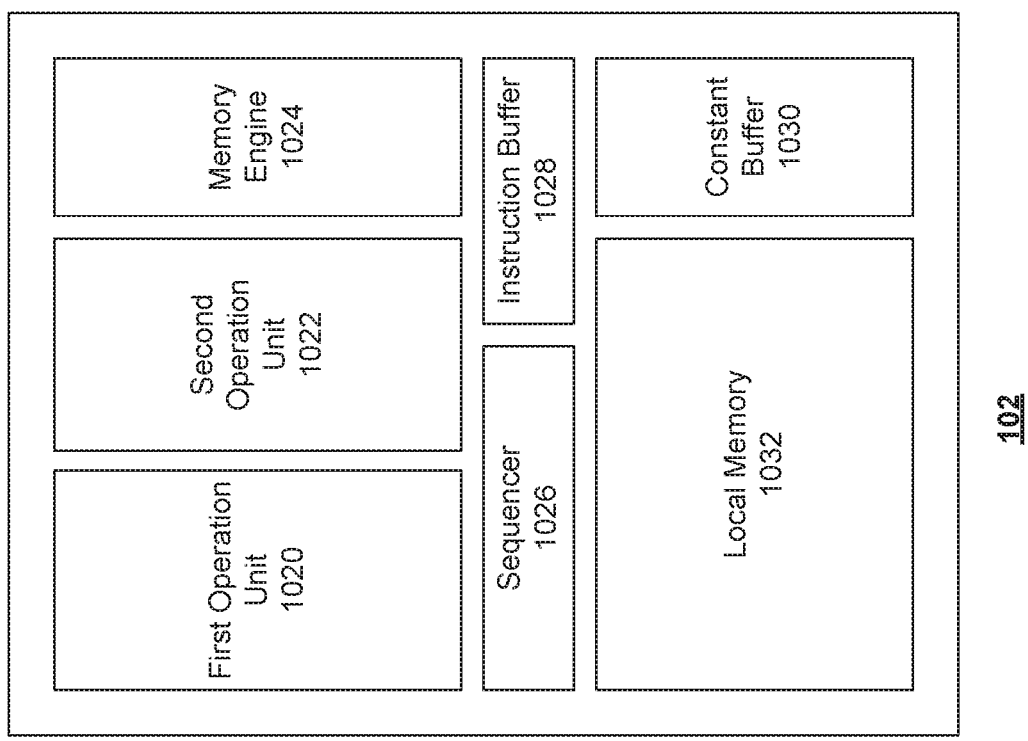
FIG. 1B illustrates an exemplary neural network accelerator core architecture, according to some embodiments of the present disclosure.

It is appreciated that the first few instructions received by the cores 102 may instruct the cores 102 to load/store data from host memory 121 into one or more local memories of the cores (e.g., local memory 1032 of FIG. 1B). Each core 102 may then initiate the instruction pipeline, which involves fetching the instruction (e.g., via a sequencer) from the instruction buffer, decoding the instruction (e.g., via a DMA unit 108 of FIG. 1A), generating local memory addresses (e.g., corresponding to an operand), reading the source data, executing or loading/storing operations, and then writing back results.

According to some embodiments, accelerator architecture 100 can further include a global memory (not shown) having memory blocks (e.g., 4 blocks of 8 GB second generation of high bandwidth memory (HBM2)) to serve as main memory. In some embodiments, the global memory can store instructions and data from host memory 121 via DMA unit 108. The instructions can then be distributed to an instruction buffer of each core assigned with the corresponding task, and the core can process these instructions accordingly.

In some embodiments, accelerator architecture 100 can further include memory controller (not shown) configured to manage reading and writing of data to and from a specific memory block (e.g., HBM2) within global memory. For example, memory controller can manage read/write data coming from core of another accelerator (e.g., from DMA unit 108 or a DMA unit corresponding to the another accelerator) or from core 102 (e.g., from a local memory in core 102). It is appreciated that more than one memory controller can be provided in accelerator architecture 100. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

It is appreciated that accelerator architecture 100 of FIG. 1A can be utilized in various neural networks, such as deep neural networks (DNNs), convolutional neural networks (CNNs), recurrent neural networks (RNNs), or the like. In addition, some embodiments can be configured for various processing architectures, such as NPUs, GPUs, FPGAs, TPUs, ASICs, any other types of heterogeneous accelerator processing units (HAPUs), or the like.

FIG. 1B illustrates an exemplary core architecture 102, according to some embodiments of the present disclosure. As shown in FIG. 1B, core 102 can include one or more operation units such as first and second operation units 1020 and 1022, a memory engine 1024, a sequencer 1026, an instruction buffer 1028, a constant buffer 1030, a local memory 1032, or the like.

One or more operation units can include first operation unit 1020 and second operation unit 1022. First operation unit 1020 can be configured to perform operations on received data (e.g., matrices). In some embodiments, first operation unit 1020 can include one or more processing units configured to perform one or more operations (e.g., multiplication, addition, multiply-accumulate, element-wise operation, etc.). In some embodiments, first operation unit 1020 is configured to accelerate execution of convolution operations or matrix multiplication operations. An example of first operation unit 1020 will be explained with respect to FIG. 2 in detail.

Second operation unit 1022 can be configured to perform a pooling operation, an interpolation operation, a region-of-interest (ROI) operation, and the like. In some embodiments, second operation unit 1022 can include an interpolation unit, a pooling data path, and the like.

Memory engine 1024 can be configured to perform a data copy within a corresponding core 102 or between two cores. DMA unit 108 can assist with copying data within a corresponding core or between two cores. For example, DMA unit 108 can support memory engine 1024 to perform data copy from a local memory (e.g., local memory 1032 of FIG. 1B) into a corresponding operation unit. Memory engine 1024 can also be configured to perform matrix transposition to make the matrix suitable to be used in the operation unit.

Sequencer 1026 can be coupled with instruction buffer 1028 and configured to retrieve commands and distribute the commands to components of core 102. For example, sequencer 1026 can distribute convolution commands or multiplication commands to first operation unit 1020, distribute pooling commands to second operation unit 1022, or distribute data copy commands to memory engine 1024. Sequencer 1026 can also be configured to monitor execution of a neural network task and parallelize sub-tasks of the neural network task to improve efficiency of the execution. In some embodiments, first operation unit 1020, second operation unit 1022, and memory engine 1024 can run in parallel under control of sequencer 1026 according to instructions stored in instruction buffer 1028.

Instruction buffer 1028 can be configured to store instructions belonging to the corresponding core 102. In some embodiments, instruction buffer 1028 is coupled with sequencer 1026 and provides instructions to the sequencer 1026. In some embodiments, instructions stored in instruction buffer 1028 can be transferred or modified by command processor 104.

Constant buffer 1030 can be configured to store constant values. In some embodiments, constant values stored in constant buffer 1030 can be used by operation units such as first operation unit 1020 or second operation unit 1022 for batch normalization, quantization, de-quantization, or the like.

Local memory 1032 can provide storage space with fast read/write speed. To reduce possible interaction with a global memory, storage space of local memory 1032 can be implemented with large capacity. With the massive storage space, most of data access can be performed within core 102 with reduced latency caused by data access. In some embodiments, to minimize data loading latency and energy consumption, static random access memory (SRAM) integrated on chip can be used as local memory 1032. In some embodiments, local memory 1032 can have a capacity of 192 MB or above. According to some embodiments of the present disclosure, local memory 1032 be evenly distributed on chip to relieve dense wiring and heating issues.

Figure 1C:
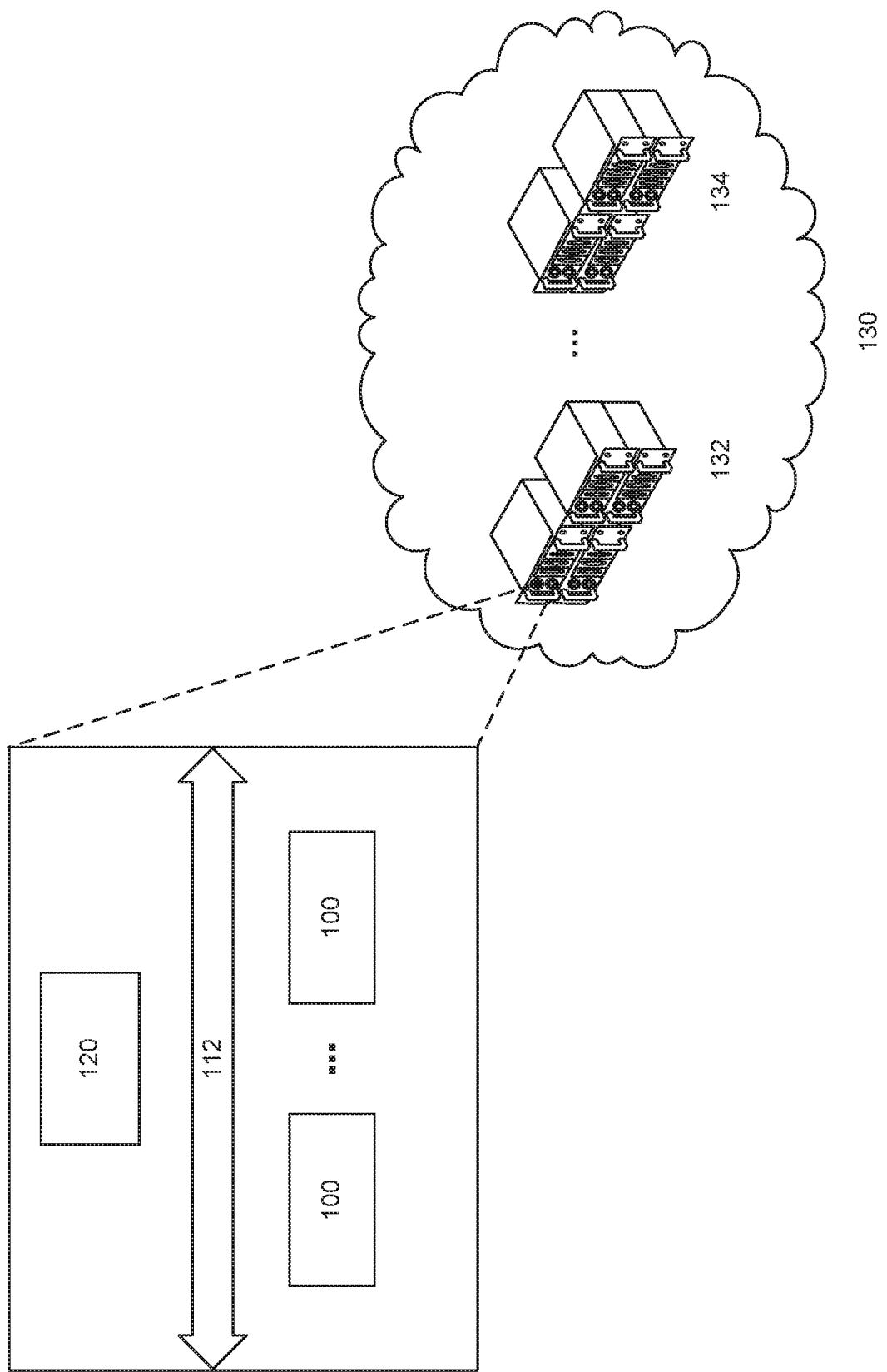
FIG. 1C illustrates a schematic diagram of an exemplary cloud system incorporating a neural network accelerator, according to some embodiments of the present disclosure.

FIG. 1C illustrates a schematic diagram of an exemplary cloud system incorporating accelerator architecture 200, according to some embodiments of the present disclosure. As shown in FIG. 1C, cloud system 130 can provide a cloud service with artificial intelligence (AI) capabilities and can include a plurality of computing servers (e.g., 132 and 134). In some embodiments, a computing server 132 can, for example, incorporate a neural network accelerator architecture 100 of FIG. 1A. Neural network accelerator architecture 100 is shown in FIG. 1C in a simplified manner for simplicity and clarity.

With the assistance of neural network accelerator architecture 100, cloud system 130 can provide the extended AI capabilities of image recognition, facial recognition, translations, 3D modeling, and the like. It is appreciated that, neural network accelerator architecture 100 can be deployed to computing devices in other forms. For example, neural network accelerator architecture 100 can also be integrated in a computing device, such as a smart phone, a tablet, and a wearable device.

Figure 2:
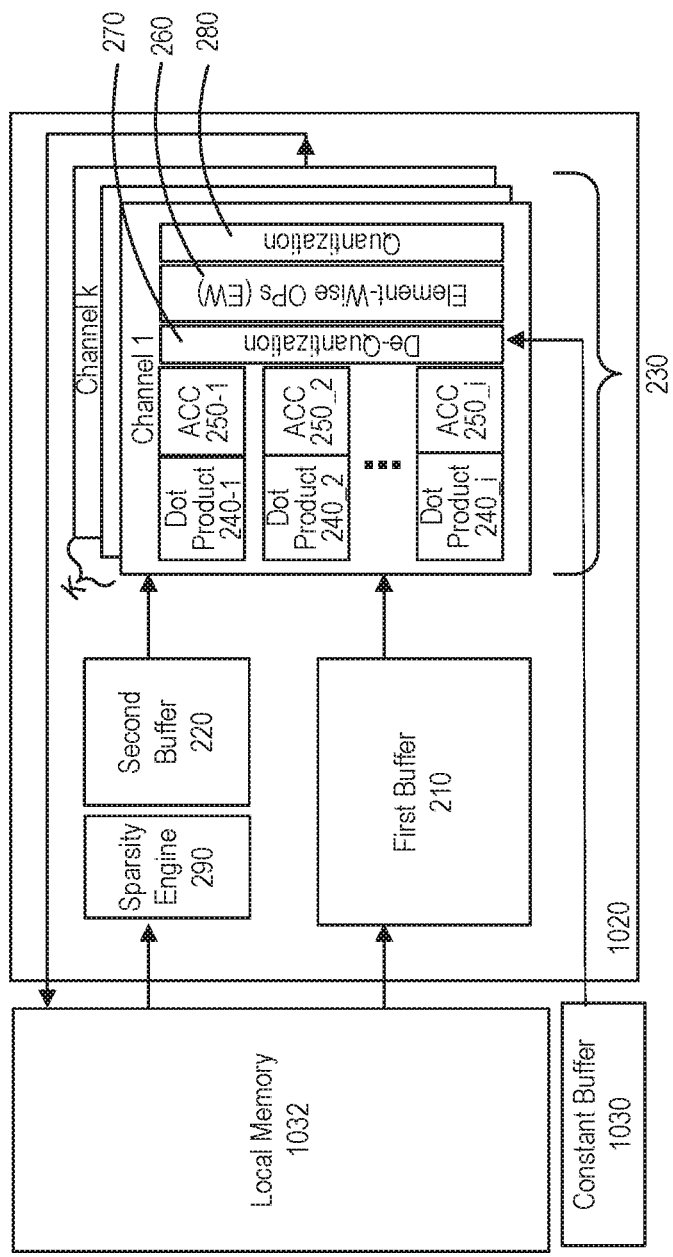
FIG. 2 illustrates an exemplary operation unit configuration, according to some embodiments of the present disclosure.

FIG. 2 illustrates an exemplary operation unit configuration 200, according to some embodiments of the present disclosure. According to some embodiments of the present disclosure, operation unit can be first operation unit (e.g., first operation unit 1020 in FIG. 1). Operation unit 1020 may include a first buffer 210, a second buffer 220, and a processing array 230.

First buffer 210 may be configured to store input data. In some embodiments, data stored in first buffer 210 can be input data to be used in processing array 230 for execution. In some embodiments, the input data can be fetched from local memory (e.g., local memory 1032 in FIG. 1B). First buffer 210 may be configured to support reuse or share of data to be used in processing array 230. In some embodiments, input data stored in first buffer 210 may be activation data for a convolution operation.

Second buffer 220 may be configured to store weight data. In some embodiments, weight data stored in second buffer 220 can be used in processing array 230 for execution. In some embodiments, the weight data stored in second buffer 220 can be fetched from local memory (e.g., local memory 1032 in FIG. 1B). In some embodiments, weight data stored in second buffer 220 may be filter data for a convolution operation.

According to some embodiments of the present disclosure, weight data stored in second buffer 220 can be compressed data. For example, weight data can be pruned data to save memory space on chip. In some embodiments, operation unit 1020 can further include a sparsity engine 290. Sparsity engine 290 can be configured to unzip compressed weight data to be used in processing array 230.

Processing array 230 may have a plurality of layers (e.g., K layers). According to some embodiments of the present disclosure, each layer of processing array 230 may include a plurality of processing strings, which may perform computations in parallel. For example, first processing string included in the first layer of processing array 230 can comprise a first multiplier (e.g., dot product) 240_1 and a first accumulator (ACC) 250_1 and second processing string can comprise a second multiplier 240_2 and a second accumulator 250_2. Similarly, i-th processing string in the first layer can comprise an i-th multiplier 240_i and an i-th accumulator 250_i.

In some embodiments, processing array 230 can perform computations under SIMD control. For example, when performing a convolution operation, each layer of processing array 230 can execute same instructions with different data.

According to some embodiments of the present disclosure, processing array 230 shown in FIG. 2 can be included in a core (e.g., core 102 in FIG. 1B). When a number of processing strings (e.g., i number of processing strings) included in one layer of processing array 230 is smaller than a number of work items (e.g., B number of work items), i number of work items can be executed by processing array 230 and subsequently the rest of work items (B-i number of work items) can be executed by the processing array 230 in some embodiments. In some other embodiments, i number of work items can be executed by processing array 230 and the rest of work items can be executed by another processing array 230 in another core.

According to some embodiments of the present disclosure, processing array 230 may further include an element-wise operation processor (OP) 260. In some embodiments, element-wise operation processor 260 can be positioned at the end of processing strings. In some embodiments, processing strings in each layer of processing array 230 can share element-wise operation processor 260. For example, i number of processing strings in the first layer of processing array 230 can share element-wise operation processor 260. In some embodiments, element-wise operation processor 260 in the first layer of processing array 230 can perform its element-wise operation on each of output values, from accumulators 250_1 to 250_i, sequentially. Similarly, element-wise operation processor 260 in the Kth layer of processing array 230 can perform its element-wise operation on each of output values, from accumulators 250_1 to 250_i, sequentially. In some embodiments, element-wise operation processor 260 can be configured to perform a plurality of element-wise operations. In some embodiments, element-wise operation performed by the element-wise operation processor 260 may include an activation function such as ReLU function, ReLU6 function, Leaky ReLU function, Sigmoid function, Tanh function, or the like.

In some embodiments, multiplier 240 or accumulator 250 may be configured to perform its operation on different data type from what the element-wise operation processor 260 performs its operations on. For example, multiplier 240 or accumulator 250 can be configured to perform its operations on integer type data such as Int 8, Int 16, and the like and element-wise operation processor 260 can perform its operations on floating point type data such as FP24, and the like. Therefore, according to some embodiments of the present disclosure, processing array 230 may further include de-quantizer 270 and quantizer 280 with element-wise operation processor 260 positioned therebetween. In some embodiments, batch normalization operations can be merged to de-quantizer 270 because both de-quantizer 270 and batch normalization operations can be performed by multiplication operations and addition operations with constants, which can be provided from constant buffer 1030. In some embodiments, batch normalization operations and de-quantization operations can be merged into one operation by compiler. As shown in FIG. 2, constant buffer 1030 can provide constants to de-quantizer 270 for de-quantization or batch normalization.

ML or DL neural networks can utilize many non-linear activation functions, including, but not limited to, ReLu, ReLu6, Leaky ReLu, Elu, GeLu, Sigmoid, Tanh, and the like. In some embodiments of the present disclosure, non-linear activation functions (e.g. ReLu, ReLu6, Leaky ReLu, GeLu, and the like) can be segmented to a plurality of sections. Or in some embodiments, inputs to non-linear activation functions can be polarized. For example, 90% of the inputs to such as Sigmoid or Tanh may be outside range [−1, 1], and thus can be polarized.

Figure 3A:
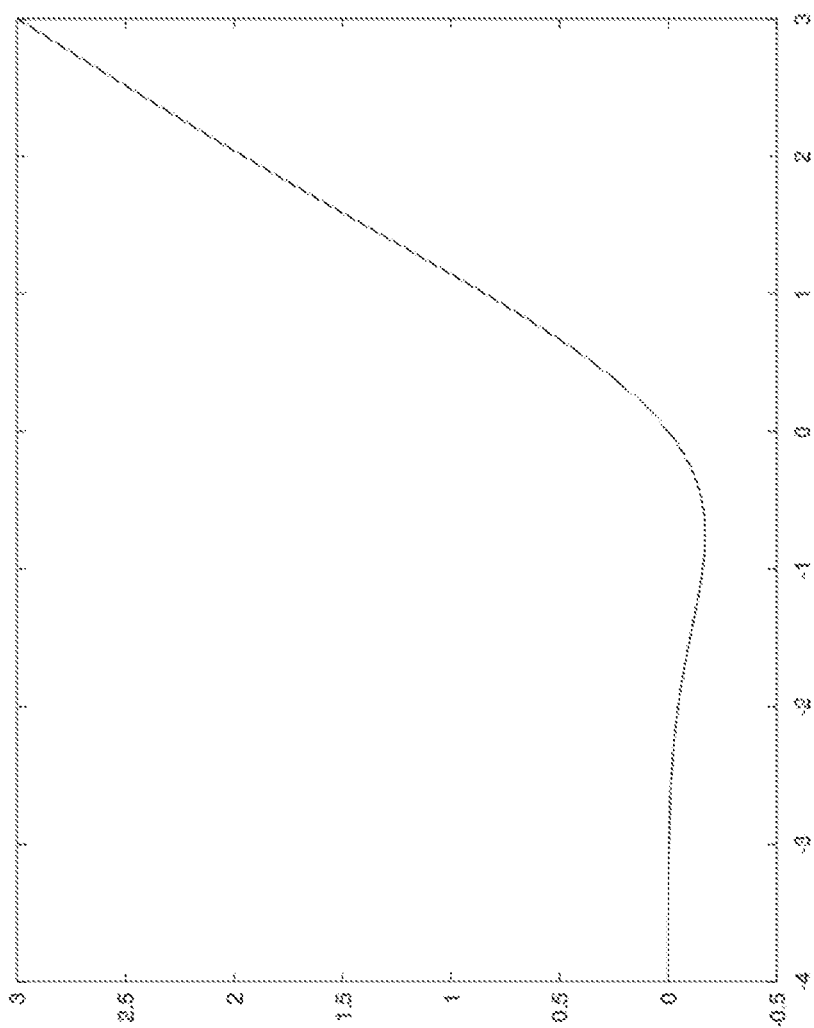
FIG. 3A illustrates a diagram of an exemplary GeLu(x) activation function, according to some embodiments of the present disclosure.

FIG. 3A illustrates a diagram of an exemplary GeLu(x) activation function 300, according to some embodiments of the present disclosure. GeLu(x) activation function is defined as follow, $$GeLu(x)=xP(X\leq x)=x\Phi(x),$$

where x represents a neuron input, and X~N(0, 1) is a cumulative distribution function of standard normal distribution. Neuron inputs x tend to follow a normal distribution, especially with Batch Normalization.

Figure 3B:
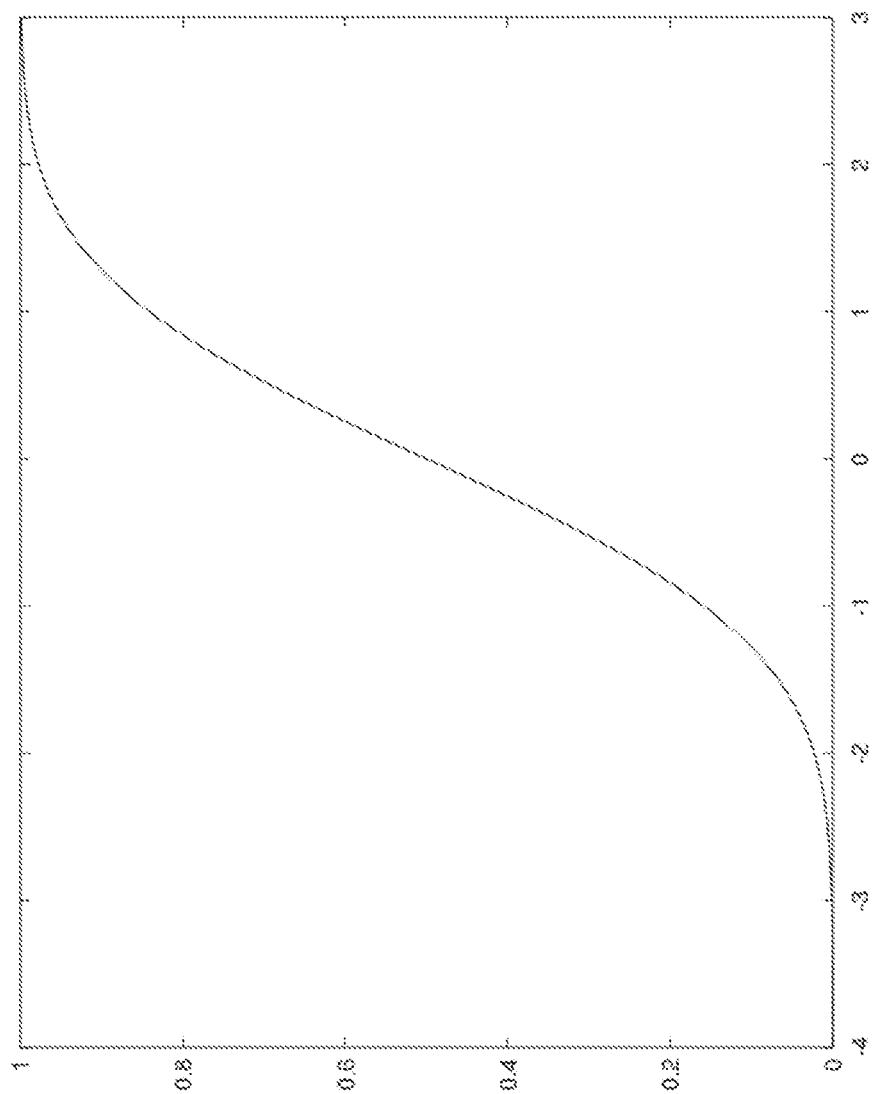
FIG. 3B illustrates a diagram of an exemplary $\Phi(x)$ function, according to some embodiments of the present disclosure.

FIG. 3B illustrates a diagram of an exemplary $\Phi(x)$ function 310, according to some embodiments of the present disclosure. $\Phi(x)$ function 310 can be approximated with $$\Phi(x)=0.5(1+\tanh[\sqrt{2/\pi}(x+0.044715x^3)]),$$

where x represents a neuron input.

Figure 3C:
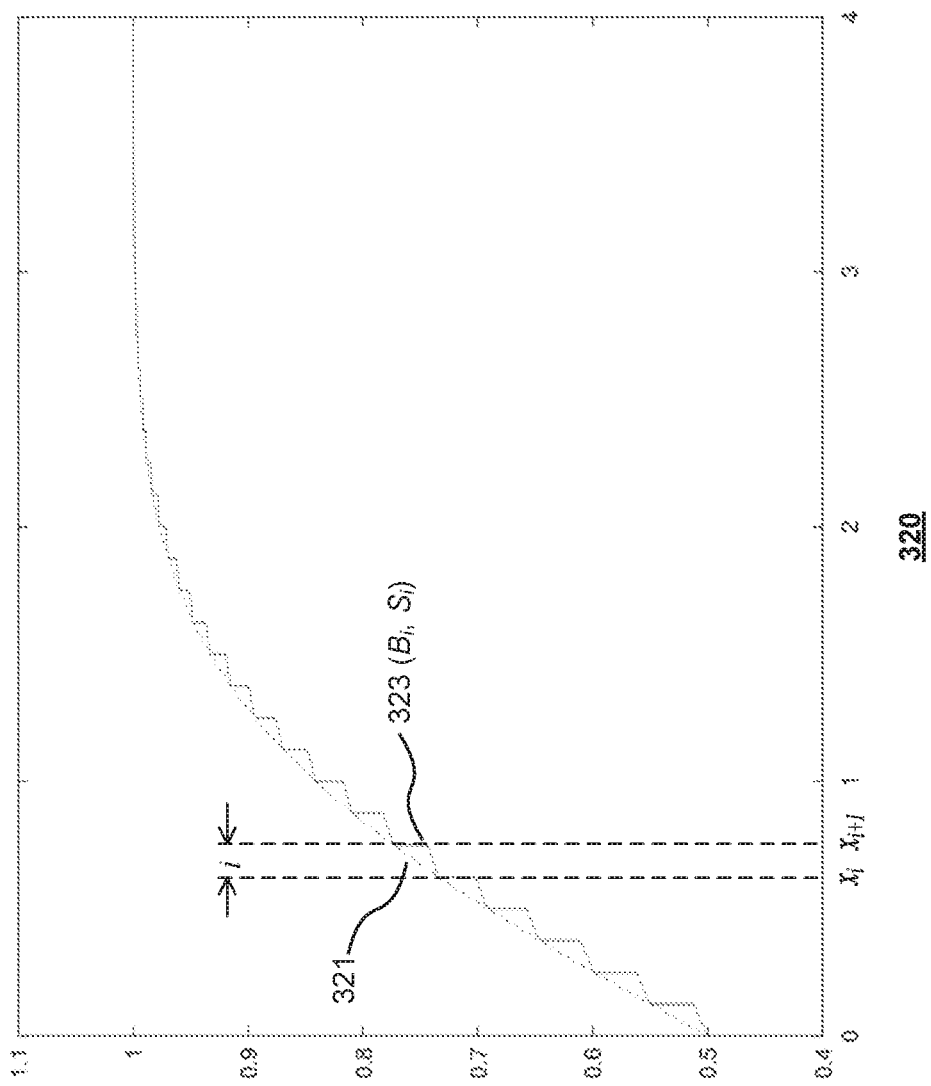
FIG. 3C illustrates a diagram of an exemplary approximation for $\Phi(x)$ function, according to some embodiments of the present disclosure.

FIG. 3C illustrates a diagram of an exemplary approximation 320 for $\Phi(x)$ function, according to some embodiments of the present disclosure. $\Phi(x)$ function can be segmented to a plurality of sections. For each section, in some embodiments, a linear interpolation can be performed using a pair of bias and slope. In some embodiments, a constant value (e.g., an absolute value) or a scale factor can be applied to approximate each section. For example, for an i-th section $[x_i, x_{i+1})$ or $(x_i, x_{i+1}]$, a linear interpolation 323 can be used to approximate a curve section of $\Phi(x)$ function. Linear interpolation 323 can have a pair of bias and slope ($B_i$, $S_i$). As another example, an absolute value or a scale factor can be applied to input x for approximation in i-th section $[x_i, x_{i+1})$ or $(x_i, x_{i+1}]$.

Although only the first quadrant is linear interpolated in FIG. 3C, it is appreciated that the third quadrant can similarly interpolated. Since $\Phi(x)$ function is rotationally symmetric about point (0, 0.5), as shown in FIG. 3B, in some embodiments, the third quadrant can be obtained by flipping the value of the first quadrant.

Figure 4A:
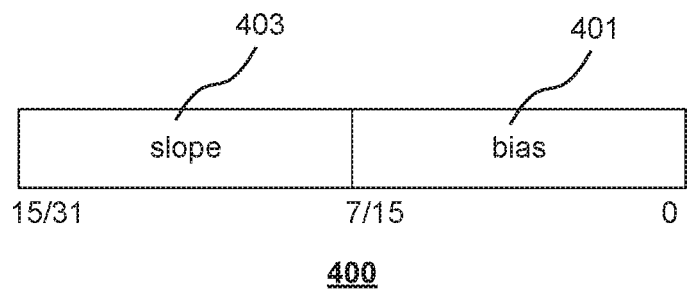
FIG. 4A illustrates an exemplary data state configuration of a lookup table (LUT), according to some embodiments of the present disclosure.

FIG. 4A illustrates an exemplary data state configuration 400 of a lookup table (LUT), according to some embodiments of the present disclosure. As shown in FIG. 4A, data state 400 can include one data entry, e.g., a pair of a bias 401 and a slope 403 for linear interpolation of a section of a non-linear activation function. For example, data state 400 can store a pair of bias 401 and slope 403 (e.g., $B_i$, $S_i$) for linear interpolation in a section (e.g., i-th section) of FIG. 3C. Data state 400 can have any suitable number of bits. For example, as shown in FIG. 4A, data state 400 can have 32 bits (bits [0:31]) including 16 bits (bits [0:15]) for storing the bias 401 and 16 bits (bits [16:31]) for storing the slope 403. As another example, data state 400 can have 16 bits (bits [0:15]) including 8 bits (bits [0:7]) for storing the bias 401 and 8 bits (bits [9:15]) for storing the slope 403, as shown in FIG. 4A.

Figure 4B:
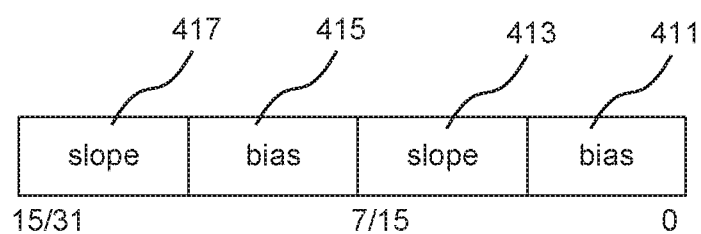
FIG. 4B illustrates another exemplary data state configuration of an LUT, according to some embodiments of the present disclosure.

FIG. 4B illustrates another exemplary data state configuration 410 of an LUT, according to some embodiments of the present disclosure. As shown in FIG. 4B, data state 410 can include a plurality of data entries, e.g., multiple pairs (e.g., two pairs) of biases (e.g., biases 411 and 415) and slopes (e.g., slopes 413 and 417) for linear interpolation of multiple sections of a non-linear activation function. For example, data state 400 can store multiple pairs of biases and slopes for linear interpolation in multiple sections of FIG. 3C. Data state 410 can have any suitable number of bits. For example, as shown in FIG. 4B, data state 410 can have 32 bits (bits [0:31]) including 16 bits (bits [0:15]) for storing a first pair of a bias 411 and slope 413 and 16 bits (bits [16:31]) for storing a second pair of a bias 415 and a slope 417. As another example, data state 410 can have 16 bits (bits [0:15]) including 8 bits (bits [0:7]) for storing a pair of a bias 411 and slope 413 and 8 bits (bits [9:15]) for storing another pair of a bias 415 and a slope 417, as shown in FIG. 4B.

Figure 4C:
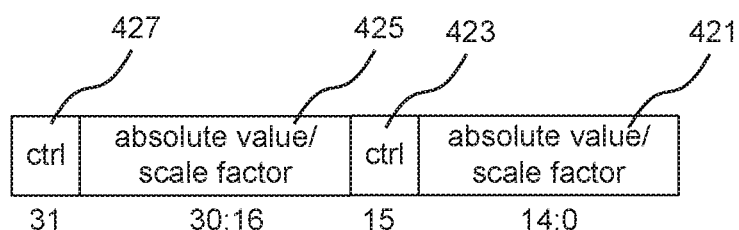
FIG. 4C illustrates another exemplary data state configuration of an LUT, according to some embodiments of the present disclosure.

FIG. 4C illustrates another exemplary data state configuration 420 of an LUT, according to some embodiments of the present disclosure. As shown in FIG. 4C, data state 420 can include one or more data entries, e.g., two data entries. Each data entry can include a pair of a value (e.g., absolute value or scale factor 421 or 425) and a control (indicated as "ctrl" in FIG. 4C, e.g., control 423 or 427) for approximation of a section of a non-linear activation function. For example, data state 420 can store one or more pairs of values and controls for approximation of one or more sections of FIG. 3C. In a data entry, control 423 or 427 can indicate whether the value is absolute value or scale factor. The absolute value can be an approximation value for a section of the non-linear activation function, while the scale factor can be a relative scale of the approximation value to input operand X. In some embodiments, the scale factor can indicate shifting input operand X left or right one or more bits. For example, the scale factor can contain S bits, one of the S bits indicating left shifting or right shifting and the other bits indicating how many bits the input operand X is shift. As another example, the scale factor can contain S bits encoded with a plurality of predefined shift values to indicate a plurality of shift operations, e.g., shifting 0 bit, right shifting 7 bits or the like.

Data state 420, control 423 or 427, or value 421 or 425 can have any suitable number of bits. For example, as shown in FIG. 4C, data state 420 can have 32 bits (bits [0:31]) including 16 bits (bits [0:15]) for storing a first pair of an absolute value or scale factor 421 and a control 423 and 16 bits (bits [16:31]) for storing a second pair of an absolute value or scale factor 425 and a control 427. In some embodiments, each control can include one bit. For example, control 423 or 427 can include bit 15 or 31, as shown in FIG. 4C.

In some embodiments, a plurality of data states (e.g., data state 400 of FIG. 4A, data state 410 of FIG. 4B, data state 420 of FIG. 4C) can be stored in a processing unit (e.g., operation unit 1020 of FIG. 1B or FIG. 2). For example, a plurality of data states can be stored in a register of a processing unit (e.g., first buffer 210 or second buffer 220 of FIG. 2). This can expedite access of data state and thus computation of a processing core (e.g., core 102 of FIGS. 1A-1B). In some embodiments, the data states can be architectural visible. Applications or programmers can access (e.g., read or written) or modify the data states. The number of data states can be dependent on worst case profiling from applications, e.g., 4, 8 or the like. Additionally, the data states can be used for other purposes. In context switch, the data states can be saved or restored in a lazy manner (e.g., only some of the data states need to be updated). The content of the data states can be determined by a lookup table (LUT) instruction configuration.

Figure 5:
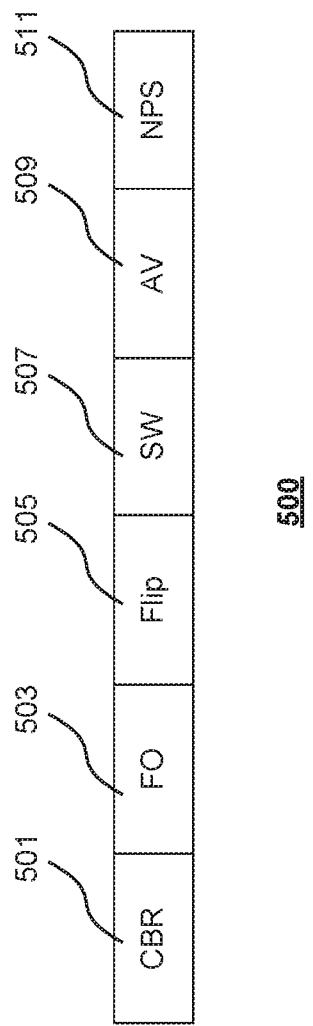
FIG. 5 illustrates an exemplary control state configuration of an LUT, according to some embodiments of the present disclosure.

FIG. 5 illustrates an exemplary control state configuration 500 of an LUT, according to some embodiments of the present disclosure. In an LUT, a control state 500 can correspond to a plurality of data states. Control state 500 can include a plurality of control fields for an LUT instruction and can determine running mode of the LUT instruction. For example, control state 500 can include a plurality of fields, including, but not limited to, a starting compare bit (CBR) field 501, a fixed offset (FO) field 503, a flip field 505, a software fallback (SW) field 507, an absolute value (AV) field 509, number of entries per state (NPS) field 511, or the like.

CBR field 501 can indicate a bit position in an input operand from which one or more bits in the input operand can be used to select a data entry from the plurality of data states. The selected data entry is associated with approximation in a section of a non-linear activation function that the input operand falls within. The CBR field 501 can contain $\log_2 W$ bits to indicate a starting compare bit position in the input operand, where W represents a width of the input operand. From the starting compare bit position, log 2N bits in the input operand can be selected for comparison, where N represents the number of data entries in the plurality of data states. Due to decimal difference, in some embodiments, the selected bits may change during execution. This field can be updated without updating the data states.

FO field 503 can indicate a fixed offset that can be added to the approximated value. FO field 503 can have variable number of bits. Flip field 505 can indicate whether values specified in the data states can be flipped to handle more sections of non-linear activation function. In some embodiments, flip field 505 can include one bit. SW field 507 can indicate a software fallback mechanism. In some embodiments, SW field 507 can include 2 bits to indicate a specific mechanism for software fallback. AV field 509 can indicate whether the values in data states are biases and slopes or absolute values/scale factors. In some embodiments, AV field 509 can include 1 bit. NPS field can indicate the number of entries per data state. In some embodiments, each data state can have one or two data entries, and NPS field can include 1 bit to indicate two valid choices, one data entry or two data entry.

In some embodiments, an LUT including one or more control states (e.g., control state 500 of FIG. 5) and their corresponding data states (e.g., data state 400 of FIG. 4A, data state 410 of FIG. 4B, data state 420 of FIG. 4C) can be stored in a processing unit (e.g., operation unit 1020 of FIG. 1B or 2). For example, the LUT can be stored in one or more registers of a processing unit (e.g., first buffer 210 or second buffer 220 of FIG. 2). This can expedite execution of an LUT instruction by a processing core (e.g., core 102 of FIGS. 1A-1B).

In some embodiments, control state (e.g., control state 500 of FIG. 5) and corresponding data state (e.g., data state 400 of FIG. 4A, data state 410 of FIG. 4B, data state 420 of FIG. 4C) can be predetermined and stored based on the non-linear function and relative error. For example, a compiler can store values to the control state or data state outside the loop (e.g., at a beginning of a program).

Figure 6:
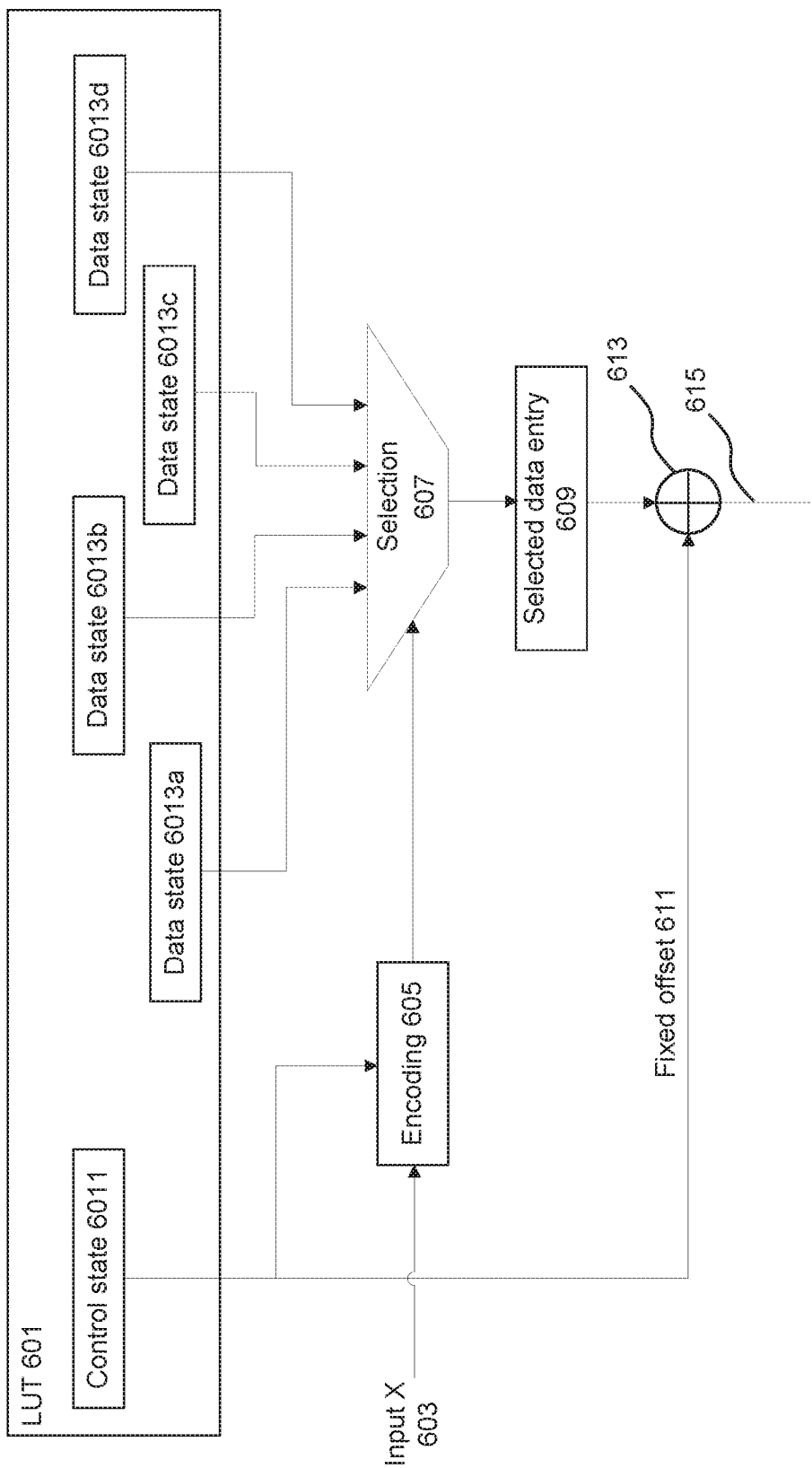
FIG. 6 illustrates a schematic representation of an exemplary LUT mechanism, according to some embodiments of the present disclosure.

FIG. 6 illustrates a schematic representation of an exemplary LUT mechanism 600, according to some embodiments of the present disclosure. It is appreciated that, in some embodiments, LUT mechanism 600 can be applied to approximation 320 of FIG. 3C, data state 400 of FIG. 4A, data state 410 of FIG. 4B, data state 420 of FIG. 4C, or control state 500 of FIG. 5. In some embodiments, LUT mechanism 600 can be implemented by core 102 of FIG. 1A, operation unit 1020 of FIG. 1B or FIG. 2, or the like.

As shown in FIG. 6, an LUT 601 can include a control state 6011 and a plurality of data states 6013 (e.g., data state 6013*a-d*, referred to as data state 6013) that are corresponding to the control state 6011. The control state 6011 and data states 6013 can be associated with a approximation of a non-linear activation function. Control state 6011 can include a plurality of fields, such as a CBR field, a FO field, a Flip field, a SW field, an AV field, or an NPS field (e.g., CBR field 501, FO field 503, Flip field 505, SW field 507, AV field 509, or NPS field 511 of control state 500 of FIG. 5, respectively). Data state 6013 (e.g., data state 400 of FIG. 4A, data state 410 of FIG. 4B, or data state 420 of FIG. 4C) can include one or more data entries. Each data entry can include a pair of a bias and a slope or a pair of a value (e.g., an absolute value or a scale factor) and a control. In some embodiments, control state 6011 can include an AV field (e.g., AV field 509 of control state 500 of FIG. 5) indicating the data type (e.g., bias and slope or absolute value/scale factor and control) in data entries of data states 6013.

LUT mechanism 600 can receive an input operand X 603. At encoding stage 605, LUT mechanism 600 can encode input operand X 603 with control state 6011. For example, control state 6011 can include a CBR field (e.g., CBR field 501 of control state 500 of FIG. 5) that indicates a bit position in the input operand X 603 from which one or more bits in the input operand X 603 can be used to select a data entry from the plurality of data states 6013. The CBR field can contain $\log_2 W$ bits to indicate a starting compare bit position in the input operand X 603, where W represents a width of the input operand X 603. From the starting compare bit position, $\log_2 N$ bits in the input operand X 603 can be selected to determine which section of the non-linear activation function the input operand X 603 falls within, where N represents the number of data entries in the plurality of data states. In a case that input operand X 603 contains 32 bits (W=32) and the plurality of data states 6013 have 8 data entries, CBR includes 5 bits to indicate a starting compare bit position from which 3 bits (N=3) can be selected from input operand X 603. If the value of CBR is A, bits [A: A+2] can be selected from input operand X 603 for comparison to determine which section of the non-linear activation function input operand X 603 falls within.

In some embodiments, control state 6011 can include an NPS field (e.g., NPS field 511 of control state 500 of FIG. 5) that indicates the number E of entries per data state 6013. In a case that the number of data states 6013 is D, the number of data entries N=E×D. For example, NPS filed can include one bit to indicate one entry or two entry per data state. At encoding stage 605, LUT mechanism 600 can use NPS field to determine the number of data entries N.

At selection stage 607, LUT mechanism 600 can use the one or more bits selected from input operand X 603 at encoding stage 605 for comparison to determine which section of the non-linear activation function input operand X 603 falls within. LUT mechanism 600 can select a data entry associated with the determined section from the plurality of data states. For example, LUT mechanism 600 can compare the one or more bits with a predetermined value (e.g., lower or upper bound of a section of the non-linear activation function) and determine, based on the comparison, which section of the non-linear activation function the input operand X 603 falls within. LUT mechanism 600 can select a data entry 609 from LUT 601 that is associated with the section containing the input operand X 603.

In some embodiments, control state 601 can include a FO field (e.g., FO field 503 of control state 500 of FIG. 5) that indicates a fixed offset value 611. LUT mechanism 600 can, at stage 613, add the fixed offset 611 to selected data entry 609 and obtain an offset data entry 615. The selected data entry 609 or offset data entry 615 can be used to determine approximation value of the non-linear activation function for input operand X 603. The approximation value can be used to execute a neural network.

In some embodiments, LUT mechanism 600 can be implemented by a processing unit (e.g., operation unit 1020 of FIG. 1B or FIG. 2). The processing unit can include one or more registers (e.g., first buffer 210 or second buffer 220 of operation unit 1020 of FIG. 2) and one or more operation elements (e.g., one or more channels in processing array 230 of operation unit 1020 of FIG. 2). The LUT can be stored in the one or more registers. One or more operation elements can receive the input operand X 603, encode it with control state 6011, and select a corresponding data entry 609 from LUT. The one or more operation elements can also offset the selected data entry 609 with a fixed offset 611 included in the control state 6011. In some embodiments, LUT mechanism 600 can be implemented by an LUT instruction.

In some embodiments, control state 6011 can include a SW field (e.g., SW field 507 of control state 500 of FIG. 5) that indicates a software fallback mechanism. At encoding stage 605, LUT mechanism 600 can check the SW field and encode the output to indicate whether or how to handle by software. For example, SW field can contain 2 bits: 00 represents no software fallback, 01 represents underflow can be handled by software, 10 represents overflow can be handled by software, and 11 represents both underflow and overflow can be handled by software. If input operand X 603 is outside a range of [CBR] to [CBR]+log$_2$N, an overflow can be determined by checking the bits before [CBR] in input operand X 603 and an underflow can be determined by checking the bits before [CBR]+log$_2$N in input operand X 603. In a case that SW field indicates no software fallback, the selected data entry can be saturated to the smallest or the largest data entry if underflow or overflow occurs. In some embodiments, LUT mechanism 600 can be implemented by an LUT instruction. If overflow or underflow is handled by software, the LUT instruction can set a state (similar to X86 instruction set), and the instruction following LUT instruction can be a Branch instruction that can branch to a software handling routine, where the approximation is handled by software. Alternatively, the LUT instruction can set a state and another instruction can store the state into a register file entry. Branch instruction can read the register file entry and determine whether to branch to a software handling routine. In some embodiments, compiler can generate a LUT instruction and optionally a following branch instruction (e.g., if software fallback is enabled) or a MAC/SMAC (special multiply-accumulate) instruction (e.g., if a bias and a slope are used).

In some embodiments, control state 6011 can include a flip field (e.g., flip field 505 of control state 500 of FIG. 5) that indicates whether values in the data states 6013 can be flipped to handle more sections of non-linear activation function. In some embodiments, flip field can include one bit. At encoding stage 605, LUT mechanism 600 can check the flip field and encode input operand X 603 with flip field. For example, if flip field is set, LUT mechanism 600 can, at encoding stage 605, check input operand X 603 (e.g., the most significant bit (MSB)) to determine whether input operand X 603 is positive or negative. If input operand X 603 is determined to be negative, LUT mechanism 600 can calculate a bitwise negation of input operand X (and optionally add 1), and select one or more bits from input operand X 603 with CBR field for comparison to select a data entry from the plurality of data states 6013. At encoding stage 605, LUT mechanism 600 can encode the output to indicate whether values in the data states 6013 can be flipped. If flip field is set, the data entries in data states 6013 can be associated with, for example, sections of the non-linear activation function above zero (e.g., sections shown in FIG. 3C). For sections below zero, the values in data entries can be flipped to obtain flip versions. In a case that a data entry includes a pair of a bias and a slop, the flip version can include a flipped bias and unchanged slope. The flipped bias can be two's complement of the bias. For example, LUT mechanism 600 can calculate a one's complement (e.g., bitwise negation) of the bias, and add 1 to a carry in bit for adding fixed offset 611 (e.g., saved as fixed offset in control state 6011). In a case that a data entry includes a pair of an absolute value or scale factor and a control, the flip version can include a flipped absolute value or unchanged scale factor and unchanged control. The filliped absolute value can be two's complement of the absolute value. For example, LUT mechanism 600 can calculate a one's complement (e.g., bitwise negation) of the absolute value, and add 1 to a carry in bit for adding fixed offset 611 (e.g., saved as fixed offset in control state 6011).

Figure 7:
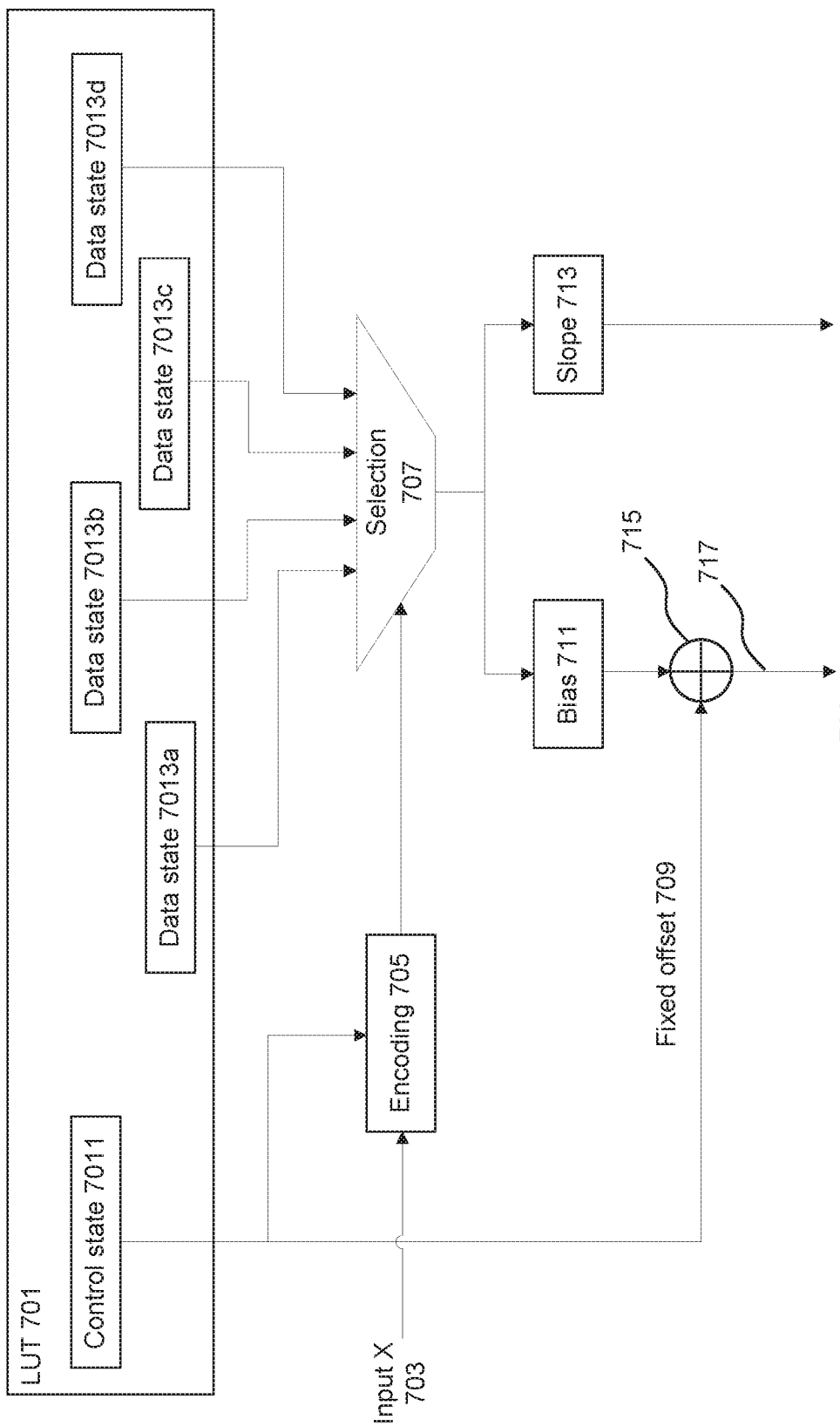
FIG. 7 illustrates a schematic representation of an exemplary bias-slope LUT mechanism, according to some embodiments of the present disclosure.

FIG. 7 illustrates a schematic representation of an exemplary bias-slope LUT mechanism 700, according to some embodiments of the present disclosure. It is appreciated that, in some embodiments, bias-slope LUT mechanism 700 can be applied to approximation 320 of FIG. 3C, data state 400 of FIG. 4A, data state 410 of FIG. 4B, control state 500 of FIG. 5, or LUT mechanism 600 of FIG. 6. In some embodiments, bias-slope LUT mechanism 700 can be implemented by core 102 of FIG. 1A, operation unit 1020 of FIG. 1B or FIG. 2, or the like.

As shown in FIG. 7, an LUT 701 can include a control state 7011 and a plurality of data states 7013 (e.g., data states 7013a-d, referred to as data state 7013) that are corresponding to the control state 7011. The control state 7011 and data states 7013 can be associated with approximation of a non-linear activation function. Control state 7011 can include a plurality of fields, such as a CBR field, a FO field, a Flip field, a SW field, an AV field, or an NPS field (e.g., CBR field 501, FO field 503, Flip field 505, SW field 507, AV field 509, or NPS field 511 of control state 500 of FIG. 5, respectively). Data state 7013 (e.g., data state 400 of FIG. 4A or data state 410 of FIG. 4B) can include one or more data entries. For example, data state 7013 can include one 16-bit entry or two 8-bit entries. Control state 7011 can include an AV field (e.g., AV field 509 of control state 500 of FIG. 5) indicating the values in the data entries are biases and slopes (e.g., AV field is set to 0). Each data entry can include a pair of a bias and a slope.

Bias-slope LUT mechanism 700 can receive an input operand X 703. At encoding stage 705, bias-slope LUT mechanism 700 can encode input operand X 703 with control state 7011. For example, similarly to LUT mechanism 600 of FIG. 6, control state 7011 can include a CBR field (e.g., CBR field 501 of control state 500 of FIG. 5) that indicates a bit position in the input operand X 703 from which one or more bits in the input operand X 703 can be used to select a data entry from the plurality of data states 7013. The CBR field can contain $\log_2 W$ bits to indicate a starting compare bit position in the input operand X 703, where W represents a width of the input operand X 703. From the starting compare bit position, log 2N bits in the input operand X 703 can be selected to determine which section of the non-linear activation function the input operand X 703 falls within, where N represents the number of data entries in the plurality of data states. In some embodiments, control state 7011 can include an NPS field (e.g., NPS field 511 of control state 500 of FIG. 5) that indicates the number E of entries per data state 7013. At encoding stage 705, bias-slope LUT mechanism 700 can use NPS field to determine the number of data entries N.

At selection stage 707, bias-slope LUT mechanism 700 can use the one or more bits selected from input operand X 703 at encoding stage 705 for comparison to determine which section of the non-linear activation function input operand X 703 falls within. Bias-slope LUT mechanism 700 can select a data entry associated with the determined section from the plurality of data states. For example, bias-slope LUT mechanism 700 can compare the one or more bits with a predetermined value (e.g., lower or upper bound of a section of the non-linear activation function) and determine, based on the comparison, which section of the non-linear activation function the input operand X 703 falls within. Bias-slope LUT mechanism 700 can select a data entry from LUT 701 that is associated with the section containing the input operand X 703. As shown in FIG. 7, below selection stage 707, bias-slope LUT mechanism 700 can obtain a bias 711 and a slope 713 included in the selected data entry.

In some embodiments, control state 7011 can include a FO field (e.g., FO field 503 of control state 500 of FIG. 5) that indicates a fixed offset value 709. Bias-slope LUT mechanism 700 can, at stage 715, add the fixed offset 709 with bias 711 and obtain an offset bias 717. The bias 711 or offset bias 717 and slope 713 can be used to calculate linear approximation of the non-linear activation function for input operand X 703.

In some embodiments, bias-slope LUT mechanism 700 can be implemented by a processing unit (e.g., operation unit 1020 of FIG. 1B or FIG. 2). The processing unit can include one or more registers (e.g., first buffer 210 or second buffer 220 of operation unit 1020 of FIG. 2) and one or more operation elements (e.g., one or more channels in processing array 230 of operation unit 1020 of FIG. 2). The LUT can be stored in the one or more registers. One or more operation elements can receive the input operand X 703, encode it with control state 701, and select a corresponding data entry from LUT. The data entry can include a bias 711 and a slope 713. The one or more operation elements can also offset the bias 711 with a fixed offset 709 included in the control state 7011. Additionally, one or more operation elements can perform other computation (e.g., multiply-accumulate (MAC)) with the data entry (e.g., bias 711 or offset bias 717 and slope 713) to obtain an approximation of the non-linear activation function for input operand X 703.

In some embodiments, bias-slope LUT mechanism 700 can be implemented by an LUT instruction. For example, the LUT instruction can include parameters R0, R1, R2, where R0 represents output operand bias 711, R1 represents output operand slope 713, and R2 represents input operand X 703. LUT instruction can be performed by a processing unit and return output operand bias R0 711 and output operand slope R1 713. In some embodiments, a MAC instruction can also be performed to obtain an approximation of the non-linear activation function for input operand X 703. The MAC instruction can receive input operand bias R0 711, input operand slope R1 713 and input operand X R2 703, and output a MAC result (e.g., approximation value). Some embodiments of the present disclosure can add one LUT instruction and remain MAC instruction unchanged to calculate the approximation of the non-linear activation function.

Figure 8:
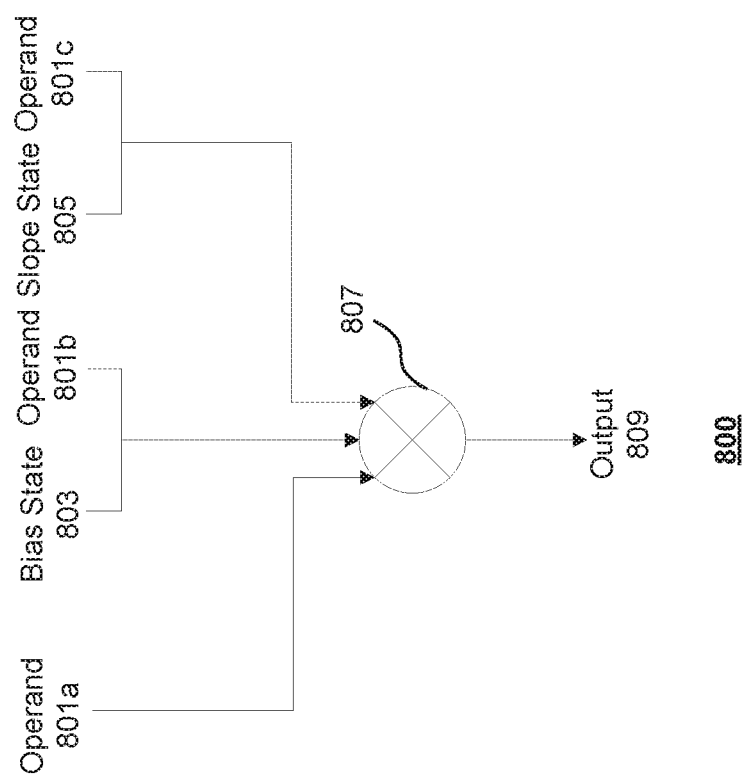
FIG. 8 illustrates a schematic representation of an exemplary approximation with bias-slope LUT mechanism, according to some embodiments of the present disclosure.

FIG. 8 illustrates a schematic representation of an exemplary approximation 800 with bias-slope LUT mechanism, according to some embodiments of the present disclosure. It is appreciated that, in some embodiments, approximation 800 can be applied to approximation 320 of FIG. 3C, data state 400 of FIG. 4A, data state 410 of FIG. 4B, control state 500 of FIG. 5, LUT mechanism 600 of FIG. 6, or bias-slope LUT mechanism 700 of FIG. 7. In some embodiments, approximation 800 can be implemented by core 102 of FIG. 1A, operation unit 1020 of FIG. 1B or FIG. 2, or the like.

A bias-slope LUT mechanism (e.g., bias-slope LUT mechanism 700 of FIG. 7) can obtain a bias or an offset bias and a slope for an input operand X 801a. The bias or offset bias and slope can be provided to MAC computation 807 as operand 801b and operand 801c, respectively, or stored in bias state 803 and slope state 805, respectively, as shown in FIG. 8. In some embodiments, similarly to the bias-slope LUT mechanism 700, the bias-slope mechanism can be implemented by an LUT instruction. Approximation 800 can be implemented by a MAC instruction or a special multiply-accumulate (SMAC) instruction. Approximation 800 can determine whether a MAC or a SMAC instruction is performed. In a case that a MAC instruction is performed, MAC instruction can use input operand X 801a, bias or offset bias operand 801b and slope operand 801c as input to perform a MAC computation 807 and obtain an output (e.g. approximation value) 809. In a case that a SMAC instruction is performed, SMAC instruction can read operands from states. For example, SMAC instruction can read bias operand from state 803 and slope operand from state 805, use input operand X 801a, bias operand and slope operand to perform a MAC computation 807, and obtain an output (e.g. approximation value) 809. For example, LUT instruction can include a parameter R0 that is input operand X 801a. LUT instruction can output bias and slope to state 803 and state 805, respectively. SMAC instruction can include parameters R0 and R2, where R0 represents input operand X 801a and R2 represents an output 809. With SMAC instruction, LUT instruction does not need to have two write operands as it does with MAC instruction.

FIG. 9 illustrates a schematic representation of an exemplary absolute value LUT mechanism 900, according to some embodiments of the present disclosure. It is appreciated that, in some embodiments, absolute value LUT mechanism 900 can be applied to approximation 320 of FIG. 3C, data state 420 of FIG. 4C, control state 500 of FIG. 5, or LUT mechanism 600 of FIG. 6. In some embodiments, absolute value LUT mechanism 900 can be implemented by core 102 of FIG. 1A, operation unit 1020 of FIG. 1B or FIG. 2, or the like.

As shown in FIG. 9, an LUT 901 can include a control state 9011 and a plurality of data states 9013 (e.g., data states 9013a-d, referred to as data state 9013) that are corresponding to the control state 9011. The control state 9011 and data states 9013 can be associated with a proximation of a non-linear activation function. Control state 9011 can include a plurality of fields, such as a CBR field, a FO field, a Flip field, a SW field, an AV field, or an NPS field (e.g., CBR field 501, FO field 503, Flip field 505, SW field 507, AV field 509, or NPS field 511 of control state 500 of FIG. 5, respectively). Data state 9013 (e.g., data state 420 of FIG. 4C) can include one or more data entries. Control state 9011 can include an AV field (e.g., AV field 509 of control state 500 of FIG. 5) indicating the values in the data entries are absolute values or scale factors and controls (e.g., AV field is set to 1). Each data entry can include a pair of a value (e.g., absolute value or scale factor 421 or 425 of FIG. 4C) and a control (e.g., control 423 or 427 of FIG. 4C) for approximation of a section of a non-linear activation function. In a data entry, a control can indicate whether the value is absolute value or scale factor. The absolute value can be an approximation value for a section of the non-linear activation function, while the scale factor can be a relative scale of the approximation value to input operand X. In some embodiments, the scale factor can indicate shifting input operand X left or right one or more bits. For example, the scale factor can contain S bits, one of the S bits indicating left shifting or right shifting and the other bits indicating how many bits the input operand X is shift. As another example, the scale factor can contain S bits encoded with a plurality of predefined shift values to indicate a plurality of shift operations, e.g., shifting 0 bit, right shifting 7 bits or the like.

For example, data state 9013 can include one 32-bit data entry where 1 bit is for a control indicating the data entry contains an absolute value or a scale factor, and 31 bits can store the absolute value if the control is set or S bits can store the scale factor if the control is not set. As another example, data state 9013 can include two 16-bit data entries. In each data entry, 1 bit is for a control indicating the data entry contains an absolute value or a scale factor, and 15 bits can store the absolute value if the control is set or S bits can store the scale factor if the control is not set.

Absolute value LUT mechanism 900 can receive an input operand X 903. At encoding stage 905, absolute value LUT mechanism 900 can encode input operand X 903 with control state 9011. For example, similarly to LUT mechanism 600 of FIG. 6 or bias-slope LUT mechanism 700 of FIG. 7, control state 9011 can include a CBR field (e.g., CBR field 501 of control state 500 of FIG. 5) that indicates a bit position in the input operand X 903 from which one or more bits in the input operand X 903 can be used to select a data entry from the plurality of data states 9013. The CBR field can contain $\log_2 W$ bits to indicate a starting compare bit position in the input operand X 903, where W represents a width of the input operand X 903. From the starting compare bit position, $\log_2 N$ bits in the input operand X 903 can be selected to determine which section of the non-linear activation function the input operand X 903 falls within, where N represents the number of data entries in the plurality of data states. In some embodiments, control state 9011 can include an NPS field (e.g., NPS field 511 of control state 500 of FIG. 5) that indicates the number of entries per data state 9013. At encoding stage 905, NPS field can be used to determine the number of data entries N.

At selection stage 907, absolute value LUT mechanism 900 can use the one or more bits selected from input operand X 903 at encoding stage 905 for comparison to determine which section of the non-linear activation function input operand X 903 falls within. Absolute value LUT mechanism 900 can select a data entry from the plurality of data states associated with the determined section. For example, absolute value LUT mechanism 900 can compare the one or more bits with a predetermined value (e.g., lower or upper bound of a section of the non-linear activation function) and determine, based on the comparison, which section of the non-linear activation function the input operand X 905 falls within. Absolute value LUT mechanism 900 can select a data entry from LUT 901 that is associated with the section containing the input operand X 903. The selected data entry can include a value (e.g., an absolute value or a scale factor) and a control 911.

In some embodiments, control state 9011 can include a FO field (e.g., FO field 503 of control state 500 of FIG. 5) that indicates a fixed offset value 909. Absolute value LUT mechanism 900 can, at stage 913, add the fixed offset 909 with the value in selected data entry and obtain an offset value.

As shown in FIG. 9, at shift stage 915, absolute value LUT mechanism 900 can shift the input operand X 903 with the value in selected data entry and obtain a shift result. At selection stage 917, absolute value LUT mechanism 900 can check control 911 in the data entry selected at selection stage 907 to select the offset value or shift result as an output (e.g., approximation value) 919. For example, if control 911 indicates that the value in selected data entry is an absolute value, absolute value LUT mechanism 900 can select offset value (e.g., offset absolute value) as output 919. If control 911 indicates that the value in selected data entry is a scale factor, absolute value LUT mechanism 900 can select shift result as output 919.

In some embodiments, absolute value LUT mechanism 900 can be implemented by a processing unit (e.g., operation unit 1020 of FIG. 1B or FIG. 2). The processing unit can include one or more registers (e.g., first buffer 210 or second buffer 220 of operation unit 1020 of FIG. 2) and one or more operation elements (e.g., one or more channels in processing array 230 of operation unit 1020 of FIG. 2). The LUT can be stored in the one or more registers. One or more operation elements can receive the input operand X 905, encode it with control state 9011, and select a corresponding data entry from LUT. The selected data entry can include a value (e.g., an absolute value or a scale factor) and a control 911. The one or more operation elements can, at stage 913, add the fixed offset 909 with the value in selected data entry and obtain an offset value, and at shift stage 915, shift the input operand X 903 with the value in selected data entry and obtain a shift result. At selection stage 917, the one or more operation elements can check control 911 in the selected data entry to select the offset value or shift result as an output (e.g., approximation value) 919.

In some embodiments, absolute value LUT mechanism 900 can be implemented by an LUT instruction. LUT instruction can be performed by a processing unit and return a selected data entry including a value (e.g., an absolute value or a scale factor) and a control. In some embodiment an addition instruction and a shift instruction can be performed to obtain an approximation value (e.g., output 919) of the non-linear activation function for input operand X 903. Absolute value LUT mechanism 900 may not involve a MAC or SMAC instruction.

It is appreciated that some embodiments of the present disclosure can be easily extended to support Single Instruction Multiple Data (SIMD) instructions. For example, control state (e.g., control state 500 of FIG. 5, control state 6011 of FIG. 6, control state 7011 of FIG. 6, or control state 9011 of FIG. 9) and data state (e.g., data state 400 of FIG. 4A, data state 410 of FIG. 4B, data state 420 of FIG. 4C, data state 6013 of FIG. 6, data state 7013 of FIG. 7, or data state 9013 of FIG. 9) can remain the same, but LUT instruction can be its SIMD version.

In some embodiments, multiple approximation functions can be used in an interleave manner. Multiple copies of control state, data state and LUT instruction can be created to handle the approximation functions separately.

In some embodiments, control state or data state can be shared with other instructions using a state when LUT functionality is not used. For example, the control state or data state can be used as scratch pad memory to spill register file values to avoid extra load or store. In some embodiments, during context switch, the control state or data state need to be saved or restored in a lazy manner.

Some embodiments of the present disclosure can provide flexibility to handle different non-linear functions with the same hardware. Unlike pure hardware LUT approach containing fixed accuracy, some embodiments can handle arbitrary precision requirement with software fallback. In some embodiments, the required number of cycles can be much less than the software approach. Table 1 illustrates number of cycles comparison, according to some embodiments of the present disclosure.

TABLE 1

| Function | Software | Absolute Value | Bias-Slope | Note |
|---|---|---|---|---|
| ReLu | 2 + 1 | 1 | 2 | No accuracy loss |
| ReLu6 | 4 + 2 | 1 | 2 | No accuracy loss |
| Leaky ReLu | 3 | 1 | 2 | 0.01x when x < 0 may be changed to 0.0078125x |
| ELu | >50 | 1 | 2 | Approximation with ⅘ entries |
| Sigmoid Tanh GeLu | >100 | 2 +> 10 | 3 +> 10 | Approximation with software backup, assume 10% probability not covered by LUT. Without backup, the Absolute value and Bias-Slope mechanisms are 1 and 2 cycles, respectively. |

In Table 1, the software approach has conditional move instruction. Regarding software approach for activation functions ReLu and ReLu6, the number after+can be hoisted outside the loop.

Embodiments of the present disclosure can be applied to many products, environments, and scenarios. For example, some embodiments of the present disclosure can be applied to Ali-NPU (e.g., Hanguang NPU), Ali-Cloud, Ali PIM-AI (Processor-in Memory for AI), Ali-DPU (Database Acceleration Unit), Ali-AI platform, GPU, TPU, or the like.

The embodiments may further be described using the following clauses:

1. A method of executing a neural network, comprising:
receiving an input operand;
selecting one or more bits from the input operand;
selecting a data entry from a lookup table (LUT) using the one or more bits;
determining an approximation value of a non-linear activation function for the input operand using the data entry; and
executing the neural network with the approximation value.

2. The method of clause 1, wherein selecting the one or more bits from the input operand comprises:
selecting the one or more bits in the input operand starting from a bit position indicated by a control sate from the LUT.

3. The method of clause 1 or clause 2, wherein selecting the data entry from the LUT using the one or more bits comprises:
determining which section of the non-linear activation function the input operand falls within using the one or more bits; and
selecting the data entry associated with the determined section from the LUT.

4. The method of any of clauses 1-3, wherein the data entry comprises a bias and a slope.

5. The method of clause 4, further comprising:
performing a multiply-accumulate (MAC) operation using the input operand, the bias, and the slope.

6. The method of clause 4, further comprising:
storing the bias and the slope in states; and
performing a special multiply-accumulate (SMAC) operation using the input operand, the bias and the slope read from the states.

7. The method any of clauses 4-6, wherein determining the approximation value of the non-linear activation function for the input operand using the data entry comprises:
adding a fixed offset indicated by a control sate from the LUT to the bias.

8. The method of any of clauses 1-3, wherein the data entry comprises a value and a control, and determining the approximation value of the non-linear activation function for the input operand using the data entry comprises:
adding a fixed offset indicated by a control sate from the LUT to the value;
shifting the input operand one or more bits according to the value; and
selecting the offset value or the shift input operand according to the control.

9. The method of clause 8, wherein the value is an absolute value of the approximation value or a scale factor of the approximation value to the input operand.

10. The method of any of clauses 1-9, further comprising:
determining whether a control state from the LUT indicates the data entry comprises a bias and a slope or a value and a control.

11. The method of any of clauses 1-10, further comprising:
determining whether a control state from the LUT indicates the data entry can be flipped;
and in response to the control state being determined indicating the data entry can be flipped, flipping the data entry.

12. The method of any of clauses 1-11, further comprising:
determining whether a control state from the LUT indicates a software fallback mechanism; and
in response to the control state being determined indicating a software fallback mechanism, applying the software fallback mechanism if underflow or overflow occurs.

13. A processing unit, comprising:
one or more registers for storing a lookup table (LUT), the LUT comprising a control state and a plurality of data entries; and
one or more operation elements communicatively coupled with the one or more registers, the one or more operation elements being configured to:
receive an input operand;
select one or more bits from the input operand;
select a data entry from the plurality of data entries using the one or more bits; and determine an approximation value of a non-linear activation function for the input operand using the data entry.

14. The processing unit of clause 13, wherein the one or more operation elements are further configured to:
select the one or more bits in the input operand starting from a bit position indicated by the control sate.

15. The processing unit any of clauses 13-14, wherein the one or more operation elements are further configured to:
determine which section of the non-linear activation function the input operand falls within using the one or more bits; and
select the data entry associated with the determined section from the plurality of data entries.

16. The processing unit of any of clauses 13-15, wherein the data entry comprises a bias and a slope.

17. The processing unit of clause 16, wherein the one or more operation elements are further configured to:
perform a multiply-accumulate (MAC) operation using the input operand, the bias, and the slope.

18. The processing unit of clause 16, wherein the one or more operation elements are further configured to:
add a fixed offset indicated by the control sate to the bias.

19. The processing unit of clause 17, wherein the one or more operation elements are configured by a LUT instruction and a MAC instruction.

20. The processing unit of clause 16 or clause 18, wherein the one or more operation elements are further configured to:
store the bias and the slope in states of the one or more registers; and
perform a special MAC (SMAC) operation using the input operand, the bias and the slope read from the states.

21. The processing unit of clause 20, wherein the one or more operation elements are configured by a LUT instruction and a SMAC instruction.

22. The processing unit of any of clauses 13-15, wherein the data entry comprises a value and a control, and wherein the one or more operation elements are further configured to:
add a fixed offset indicated by the control sate to the value;
shift the input operand one or more bits according to the value; and
select the offset value or the shift input operand according to the control.

23. The processing unit of clause 22, wherein the value is an absolute value of the approximation value or a scale factor of the approximation value to the input operand.

24. The processing unit of any of clauses 13-23, wherein the one or more operation elements are further configured to:
determine whether the control state indicates the data entry comprises a bias and a slope or a value and a control.

25. The processing unit of any of clauses 13-24, wherein the one or more operation elements are further configured to:
determine whether the control state indicates the data entry can be flipped; and
in response to the control state being determined indicating the data entry can be flipped, flip the data entry.

26. The processing unit of any of clauses 13-25, wherein the one or more operation elements are further configured to:
determine whether the control state indicates a software fallback mechanism; and
in response to the control state being determined indicating a software fallback mechanism, apply the software fallback mechanism if underflow or overflow occurs.

27. A processing core, comprising:
a local memory;
an operation unit communicatively coupled with the local memory, the operation unit comprising:
one or more registers for storing a lookup table (LUT), the LUT comprising a control state and a plurality of data entries; and
one or more operation elements communicatively coupled with the one or more registers, the one or more operation elements being configured to:
receive an input operand;
select one or more bits from the input operand;
select a data entry from the plurality of data entries using the one or more bits; and
determine an approximation value of a non-linear activation function for the input operand using the data entry.

28. A non-transitory computer readable storage medium storing a set of instructions that are executable by one or more processing devices to cause a processing unit to perform a method comprising:
receiving an input operand;
selecting one or more bits from the input operand;
selecting a data entry from a lookup table (LUT) using the one or more bits;
determining an approximation value of a non-linear activation function for the input operand using the data entry; and
executing the neural network with the approximation value.

29. The non-transitory computer readable storage medium of clause 28, wherein the set of instructions are executable by the one or more processing devices to cause the processing unit to perform:
selecting the one or more bits in the input operand starting from a bit position indicated by a control sate from the LUT.

30. The non-transitory computer readable storage medium of clause 28 or clause 29, wherein the set of instructions are executable by the one or more processing devices to cause the processing unit to perform:
determining which section of the non-linear activation function the input operand falls within using the one or more bits; and
selecting the data entry associated with the determined section from the LUT.

31. The non-transitory computer readable storage medium of any of clauses 28-30, wherein the data entry comprises a bias and a slope.

32. The non-transitory computer readable storage medium of clause 31, wherein the set of instructions are executable by the one or more processing devices to cause the processing unit to perform:
performing a multiply-accumulate (MAC) operation using the input operand, the bias and the slope.

33. The non-transitory computer readable storage medium of clause 31, wherein the set of instructions are executable by the one or more processing devices to cause the processing unit to perform:
adding a fixed offset indicated by a control sate from the LUT to the bias.

34. The non-transitory computer readable storage medium of clause 31 or clause 33, wherein the set of instructions are executable by the one or more processing devices to cause the processing unit to perform:
storing the bias and the slope in states; and
performing a special MAC (SMAC) operation using the input operand, the bias and the slope read from the states.

35. The non-transitory computer readable storage medium of any of clauses 28-30, wherein the data entry comprises a value and a control, and wherein the set of instructions are executable by the one or more processing devices to cause the processing unit to perform:

adding a fixed offset indicated by a control sate from the LUT to the value;

shifting the input operand one or more bits according to the value; and selecting the offset value or the shift input operand according to the control.

36. The non-transitory computer readable storage medium of clause 35, wherein the value is an absolute value of the approximation value or a scale factor of the approximation value to the input operand.

37. The non-transitory computer readable storage medium of any of clauses 28-36, wherein the set of instructions are executable by the one or more processing devices to cause the processing unit to perform:

determining whether a control state from the LUT indicates the data entry comprises a bias and a slope or a value and a control.

38. The non-transitory computer readable storage medium of any of clauses 28-37, wherein the set of instructions are executable by the one or more processing devices to cause the processing unit to perform:

determining whether a control state from the LUT indicates the data entry can be flipped; and in response to the control state being determined indicating the data entry can be flipped, flipping the data entry.

39. The non-transitory computer readable storage medium of any of clauses 28-38, wherein the set of instructions are executable by the one or more processing devices to cause the processing unit to perform:

determining whether a control state from the LUT indicates a software fallback mechanism; and in response to the control state being determined indicating a software fallback mechanism, applying the software fallback mechanism if underflow or overflow occurs.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. In some embodiments, the computer readable medium can be a non-transitory computer readable medium. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the present disclosure are apparent from the detailed specification, and thus, it is intended that the appended claims cover all systems and methods falling within the true spirit and scope of the present disclosure. As used herein, the indefinite articles "a" and "an" mean "one or more." Further, since numerous modifications and variations will readily occur from studying the present disclosure, it is not desired to limit the present disclosure to the exact construction and operation illustrated and described, and accordingly, all suitable modifications and equivalents may be resorted to, falling within the scope of the present disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A processing unit, comprising:
   one or more registers for storing a lookup table (LUT), the LUT comprising a control state and a plurality of data entries; and
   one or more operation elements communicatively coupled with the one or more registers, the one or more operation elements being configured to:
      receive an input operand;
      select one or more bits from the input operand based on the control state, wherein the one or more bits from the input operand are indicated by the control state;
      select a data entry from the plurality of data entries using the one or more bits; and determine an approximation value of a non-linear activation function for the input operand using the data entry.

2. The processing unit of claim 1, wherein the one or more operation elements are further configured to:
select the one or more bits in the input operand starting from a bit position indicated by the control sate.

3. The processing unit of claim 1, wherein the one or more operation elements are further configured to:
determine which section of the non-linear activation function the input operand falls within using the one or more bits; and
select the data entry associated with the determined section from the plurality of data entries.

4. The processing unit of claim 1, wherein the data entry comprises a bias and a slope.

5. The processing unit of claim 4, wherein the one or more operation elements are further configured to:
perform a multiply-accumulate (MAC) operation using the input operand, the bias, and the slope.

6. The processing unit of claim 4, wherein the one or more operation elements are further configured to:
add a fixed offset indicated by the control sate to the bias.

7. The processing unit of claim 5, wherein the one or more operation elements are configured by a LUT instruction and a MAC instruction.

8. The processing unit of claim 4, wherein the one or more operation elements are further configured to:
store the bias and the slope in states of the one or more registers; and
perform a special MAC (SMAC) operation using the input operand, the bias and the slope read from the states.

9. The processing unit of claim 8, wherein the one or more operation elements are configured by a LUT instruction and a SMAC instruction.

10. The processing unit of claim 1, wherein the data entry comprises a value and a control, and wherein the one or more operation elements are further configured to:
add a fixed offset indicated by the control sate to the value;
shift the input operand one or more bits according to the value; and
select the offset value or the shift input operand according to the control.

11. The processing unit of claim 10, wherein the value is an absolute value of the approximation value or a scale factor of the approximation value to the input operand.

12. The processing unit of claim 1, wherein the one or more operation elements are further configured to:
determine whether the control state indicates the data entry comprises a bias and a slope or a value and a control.

13. The processing unit of claim 1, wherein the one or more operation elements are further configured to:
determine whether the control state indicates the data entry can be flipped; and
in response to the control state being determined indicating the data entry can be flipped, flip the data entry.

14. The processing unit of claim 1, wherein the one or more operation elements are further configured to:
determine whether the control state indicates a software fallback mechanism; and
in response to the control state being determined indicating a software fallback mechanism, apply the software fallback mechanism if underflow or overflow occurs.

15. A processing core, comprising:
a local memory;
an operation unit communicatively coupled with the local memory, the operation unit comprising:
one or more registers for storing a lookup table (LUT), the LUT comprising a control state and a plurality of data entries; and
one or more operation elements communicatively coupled with the one or more registers, the one or more operation elements being configured to:
receive an input operand;
select one or more bits from the input operand based on the control state, wherein the one or more bits from the input operand are indicated by the control state;
select a data entry from the plurality of data entries using the one or more bits; and
determine an approximation value of a non-linear activation function for the input operand using the data entry.

16. A non-transitory computer readable storage medium storing a set of instructions that are executable by one or more processing devices to cause a processing unit to perform a method comprising:
receiving an input operand;
selecting one or more bits from the input operand based on the control state, wherein the one or more bits from the input operand are indicated by the control state;
selecting a data entry from a lookup table (LUT) using the one or more bits;
determining an approximation value of a non-linear activation function for the input operand using the data entry; and
executing the neural network with the approximation value.

17. The non-transitory computer readable storage medium of claim 16, wherein the set of instructions are executable by the one or more processing devices to cause the processing unit to perform:
determining which section of the non-linear activation function the input operand falls within using the one or more bits; and
selecting the data entry associated with the determined section from the LUT.

18. The non-transitory computer readable storage medium of claim 16, wherein the data entry comprises a bias and a slope, and the set of instructions are executable by the one or more processing devices to cause the processing unit to perform:
performing a multiply-accumulate (MAC) or a special multiply-accumulate (SMAC) operation using the input operand, the bias, and the slope.

19. The non-transitory computer readable storage medium of claim 16, wherein the data entry comprises a value and a control, the value being an absolute value of the approximation value or a scale factor of the approximation value to the input operand and the set of instructions are executable by the one or more processing devices to cause the processing unit to perform:
adding a fixed offset indicated by a control sate from the LUT to the value;
shifting the input operand one or more bits according to the value; and
selecting the offset value or the shift input operand according to the control.

20. The non-transitory computer readable storage medium of claim 16, wherein the set of instructions are executable by the one or more processing devices to cause the processing unit to perform:
- determining whether a control state from the LUT indicates the data entry can be flipped; and
- in response to the control state being determined indicating the data entry can be flipped, flipping the data entry.

* * * * *